(12) United States Patent
Orlandi et al.

(10) Patent No.: US 10,549,383 B2
(45) Date of Patent: Feb. 4, 2020

(54) HIGHLY POSITIONED LASER PROCESSING NOZZLE

(71) Applicant: Hypertherm, Inc., Hanover, NH (US)

(72) Inventors: Davide Orlandi, Bologna (IT); David J. Cook, Bradford, VT (US); David L. Bouthillier, Hartford, VT (US); Joe Ciambra, Thetford Center, VT (US)

(73) Assignee: Hypertherm, Inc., Hanover, NH (US)

( * ) Notice: Subject to any disclaimer, the term of this patent is extended or adjusted under 35 U.S.C. 154(b) by 537 days.

(21) Appl. No.: 15/339,077

(22) Filed: Oct. 31, 2016

(65) Prior Publication Data

US 2017/0120381 A1 May 4, 2017

Related U.S. Application Data

(60) Provisional application No. 62/248,943, filed on Oct. 30, 2015, provisional application No. 62/360,908, filed on Jul. 11, 2016.

(51) Int. Cl.
*B23K 26/14* (2014.01)
*B23K 26/38* (2014.01)

(52) U.S. Cl.
CPC .......... *B23K 26/1476* (2013.01); *B23K 26/38* (2013.01)

(58) Field of Classification Search
CPC ... B23K 26/1476; B23K 26/142; B23K 26/38
See application file for complete search history.

(56) References Cited

U.S. PATENT DOCUMENTS 4,121,085 A * 10/1978 Diemer ................ C08F 2/005
219/121.74
5,128,508 A 7/1992 Klingel
(Continued)

FOREIGN PATENT DOCUMENTS

EP 2875896 B1 10/2016
JP 04313485 11/1992
(Continued)

OTHER PUBLICATIONS

Amada America Inc.,"Amada WACS System", Retrieved from the internet at: http://www.amada.de/en/laser/wacssystem. html, printed Oct. 27, 2016, 2 pages.
(Continued)

*Primary Examiner* — Thien S Tran
(74) *Attorney, Agent, or Firm* — Proskauer Rose LLP

(57) ABSTRACT

The invention features a double nozzle for a laser processing head and related methods for cutting a workpiece. The double nozzle includes an inner body portion having an interior surface defining a first bore, a first exterior circumferential surface disposed toward a distal end of the inner body portion, and a second exterior circumferential surface disposed toward a proximal end of the inner body portion. The second exterior circumferential surface is shaped to mate and align with the laser processing head. The double nozzle also includes an outer body portion having an interior surface defining a second bore. The outer body portion matingly engages with the first exterior circumferential surface of the inner body portion and is isolated from direct alignment contact with the laser processing head. The inner body portion and the outer body portion are aligned to define a coaxial fluid flow path therethrough.

20 Claims, 5 Drawing Sheets

(56) References Cited

U.S. PATENT DOCUMENTS

| | | | |
|---|---|---|---|
| 6,118,097 | A | 9/2000 | Kaga et al. |
| 6,424,082 | B1 | 7/2002 | Hackett et al. |
| 6,667,459 | B1 | 12/2003 | Woods et al. |
| 7,186,947 | B2 | 3/2007 | Connally et al. |
| 7,345,257 | B2 | 3/2008 | Yamazaki et al. |
| 7,626,136 | B2 | 12/2009 | Sato et al. |
| 8,097,828 | B2 | 1/2012 | Roberts et al. |
| 8,188,403 | B2 | 5/2012 | Speker |
| 8,344,284 | B2 | 1/2013 | Miyasaki et al. |
| 9,533,373 | B2 | 1/2017 | Sato et al. |
| 2017/0189993 | A1 * | 7/2017 | Lefebvfre ............ B23K 37/006 |

FOREIGN PATENT DOCUMENTS

| | | | |
|---|---|---|---|
| JP | 11090672 | | 4/1999 |
| JP | 11141822 | | 5/1999 |
| JP | 2011177788 | | 9/2011 |
| JP | 2014054638 A | * | 3/2014 |
| WO | 9858760 | | 12/1998 |
| WO | WO-2015170029 A1 * | 11/2015 | ........... B23K 37/006 |

OTHER PUBLICATIONS

Machine Translation of JPH1190672A, Apr. 6, 1999, Amada Co Ltd.

\* cited by examiner

1
HIGHLY POSITIONED LASER PROCESSING NOZZLE

RELATED APPLICATIONS

This application claims the benefit of U.S. Provisional Patent Application No. 62/248,943, which was filed on Oct. 30, 2015 and entitled "Highly Positioned Laser Processing Nozzle." This application also claims the benefit of U.S. Provisional Patent Application No. 62/360,908, which was filed on Jul. 11, 2016 and entitled "Multiple Flow Grooved Highly Positioned Laser Processing Nozzle." The entire contents of these applications are incorporated herein by reference.

FIELD OF THE INVENTION

The invention relates generally to the field of laser cutting systems and processes. More specifically, the invention relates to improved alignment of a laser beam within a double nozzle.

BACKGROUND

Material processing apparatuses, such as laser cutting machines, are widely used in the cutting, welding, and heat treating of materials. A laser-cutting machine generally includes a high-power laser, a nozzle, a gas stream, an optical system, and a computer numeric control (CNC) system. The laser beam and gas stream pass through an orifice of the nozzle and impinge upon a workpiece. The laser beam heats the workpiece, which, in conjunction with any chemical reaction between the gas and workpiece material, alters (e.g., liquefies and/or vaporizes) a selected area of workpiece, allowing an operator to cut or otherwise modify the workpiece. The laser optics and CNC are used to position and direct the laser beam relative to the workpiece during a cutting operation. Lasers are frequently used in material processing applications because laser beams can be focused to small spot sizes, thereby achieving the intensity and power density desired to process industrial-strength materials, such as metals.

In conventional laser cutting systems, alignment of system components (e.g., nozzles) can be critical to system life and performance. For example, alignment of the nozzle bore and/or orifice to the nozzle holder and laser cutting head optics can be critical to proper functioning of the laser cutting process. In addition, alignment of the laser beam and the gas jet can be critical to achieving uniform cut quality around all sides of the workpiece. One instance in which alignment issues manifest is during component replacement and installation, during which the nozzle bore(s) and/or orifice(s) must be aligned with a longitudinal axis of the laser head, and thus the laser beam, so as to avoid non-symmetric gas flow about the beam. The problem is compounded because conventional nozzles must be replaced frequently, and each nozzle replacement can involve a complex installation and verification to prove alignment. In addition, because components must often be replaced in the field, significant machine down time and technician expertise can be required to ensure proper installation and alignment. Field replacement can also require specialized tools to attain, verify, and maintain proper component alignment.

One type of nozzle, a "double nozzle," has specific benefits for laser cutting applications but also creates unique issues around alignment of component parts. Structurally, a double nozzle typically has two pieces (an inner and an outer nozzle portion) that are press-fitted or threaded together. A primary function of a double nozzle is to create two separate flows of gas within an inner and an outer nozzle portion. One flow of gas is delivered through a central bore and positioned along the axis of the laser beam itself, while a second flow of gas surrounds the central bore and provides a coaxial flow of lower pressure gas. The central flow helps to remove material during the cutting process as the laser beam heats the material and the process gas ejects the material from the kerf, while the lower pressure coaxial flow provides a protective flow around the central flow, preventing entrainment of air into the molten kerf and surrounding the kerf with the correct gas chemistry for the material being processed.

FIG. 1 shows a prior art double nozzle configuration. In this embodiment, a double nozzle 100 includes an inner body portion 102 (inner nozzle portion) and an outer body portion 104 (outer nozzle portion) joined at an interface surface 124. The inner body portion 102 has an orifice 112 that permits the laser beam to pass through the double nozzle 100. The outer body portion 104 has an orifice 114 and an alignment surface 122 for aligning the double nozzle 100 with a laser machining head (not shown). In this configuration, two separate surface interfaces determine alignment of the inner nozzle orifice 112 relative to a longitudinal axis 107 of the laser machining head and thus the laser beam itself: (1) the alignment surface 122 with the laser machining head; and (2) the nozzle interface 124 between the inner body portion 102 and the outer body portion 104.

The inner nozzle orifice 112 of inner body portion 102 in FIG. 1 is smaller than the outer nozzle orifice 114 and is located closer to the laser beam during operation than the outer nozzle orifice 114. Thus, alignment of the inner nozzle orifice 112 can be particularly important to performance and life of the double nozzle 100. The alignment of the inner nozzle orifice 112 with the longitudinal axis 107 of the laser machining head, and thus the laser beam via two separate interfaces, depends on the accuracy and precision of four separate surfaces that create each of these two-surface interfaces. Therefore, a high level of manufacturing precision is required on these four surfaces, as well as installation accuracy and verification to ensure proper life and performance; misalignment in any of these components can have a dramatic impact on alignment of the inner nozzle orifice 112 relative to longitudinal axis 107 of the laser beam. What is needed is a double nozzle configuration that reduces the number of opportunities for misalignment, thereby improving alignment of the laser beam and the nozzle bore and/or orifice, and simplifies installation and operation.

SUMMARY OF THE INVENTION

The present invention relates to systems and methods for aligning a laser beam within a nozzle bore and/or orifice of a laser cutting system. In particular, certain surfaces between constituent parts of the nozzle are re-designed (e.g., the surface between an inner bore of a double nozzle and a longitudinal axis of the laser machining head) so that the number of interface surfaces (i.e., opportunities for misalignment) is minimized. In a new configuration in accordance with the present invention, alignment of the beam and the nozzle bore, and consequently gas shrouding and alignment, are improved. In addition, manufacturing tolerances on nozzle interfaces are loosened, and operation and installation of the system are simplified.

In one aspect, the invention features a double nozzle for a laser processing head. The double nozzle includes an inner body portion having an interior surface defining a first bore, a first exterior circumferential surface disposed toward a distal end of the inner body portion, and a second exterior circumferential surface disposed toward a proximal end of the inner body portion. The second exterior circumferential surface is shaped to mate and align with the laser processing head. The double nozzle also includes an outer body portion having an interior surface defining a second bore. The outer body portion matingly engages with the first exterior circumferential surface of the inner body portion and is isolated from direct alignment contact with the laser processing head. The inner body portion and the outer body portion are aligned to define a coaxial fluid flow path therethrough.

In some embodiments, the second exterior circumferential surface is tapered relative to a longitudinal axis of the double nozzle. In some embodiments, the tapered surface is at an angle of about 4.5 degrees to about 5.5 degrees with respect to the longitudinal axis. In some embodiments, the double nozzle further includes a set of fluid flow paths formed between the inner body portion and the outer body portion. In some embodiments, the set of fluid flow paths is formed at an interface between the first exterior circumferential surface of the inner body portion and the outer body portion. In some embodiments, the set of fluid flow paths includes six distinct flow paths. In some embodiments, the second exterior circumferential surface includes a conical interference interface with the interior surface of the outer body portion, the conical interface including a spacing of about 0.001 to 0.003 inches between the surfaces. In some embodiments, the inner body portion and the outer body portion are crimped using a force of about 2000 lbF. In some embodiments, the second bore of the outer body portion includes an axial stop for positioning relative to the inner body portion. In some embodiments, the inner body portion has a conical datum feature received by the second bore of the outer body portion. In some embodiments, the inner body portion and the outer body portion can provide at least about 25% improvement in alignment. That is, the new designs and configurations described herein can provide better alignment than conventional systems. In some embodiments, the double nozzle is configured to provide a better flow profile than some conventional systems. For example, in some cases, the systems and methods herein can yield a flow that is more uniform and allow for a wider range of adjustment in flow rate than some conventional systems. By way of an example comparison, a 3-slot nozzle can produce pressures that vary between 1 psi and 1.33 psi, which can be a peak-peak variation of 28% about the mean. Whereas, in some examples, the inventive nozzles described herein can also produce pressures that vary between 1.51 psi and 1.57 psi, which can be a peak-peak variation of 4% about the mean. In other words, the inventive multiple flow grooved nozzles described herein can result in ~7x reduction in flow non-uniformities compared to some conventional 3-slot nozzles.

In another aspect, the invention features a method of cutting a workpiece using a laser cutting system. The method includes providing a laser processing head and a double nozzle. The double nozzle has an inner body portion, an outer body portion, and an axial bore. The inner body portion has a first exterior surface shaped to complement a contoured alignment surface on the laser processing head and a second exterior surface shaped to complement an interior circumferential mating surface of the outer body portion. The outer body portion is secured to the inner body portion along the circumferential mating surface and isolated from direct alignment contact with the laser processing head. The method further includes installing the double nozzle in the laser processing head to align to a longitudinal axis of the laser processing head. The method further includes flowing a fluid through a primary flow path and at least one secondary flow path formed in the double nozzle. The method further includes generating a laser beam along the longitudinal axis of the laser processing head. The method further includes cutting a workpiece with the laser beam as it exits the double nozzle.

In some embodiments, the second exterior surface is tapered relative to a longitudinal axis of the double nozzle. In some embodiments, the taper is at an angle of about 4.5 degrees to about 5.5 degrees relative to the longitudinal axis. In some embodiments, the double nozzle further comprises a set of fluid flow paths formed between the inner body portion and the outer body portion. In some embodiments, the set of fluid flow paths is formed at an interface between the first exterior surface of the inner body portion and the outer body portion. In some embodiments, the set of fluid flow paths includes six distinct flow paths. In some embodiments, the second exterior surface is a conical interference interface with the interior surface of the outer body portion, the conical interface including a spacing of about 0.001 to 0.003 inches between the surfaces. In some embodiments, the inner body portion and the outer body portion are crimped using a force of about 2000 lbF. In some embodiments, the second bore of the outer body portion includes an axial stop for positioning relative to the inner body portion. In some embodiments, the inner body portion has a conical datum feature received by the second bore of the outer body portion. In some embodiments, the inner body portion and the outer body portion can provide at least about 25% improvement in alignment. That is, the new designs and configurations described herein can provide better alignment than conventional systems. In some embodiments, the double nozzle is configured to provide a better flow profile than some conventional systems. For example, in some cases, the systems and methods herein can yield a flow that is more uniform and allow for a wider range of adjustment in flow rate than some conventional systems. By way of an example comparison, a 3-slot nozzle can produce pressures that vary between 1 psi and 1.33 psi, which can be a peak-peak variation of 28% about the mean. Whereas, in some examples, the inventive nozzles described herein can also produce pressures that vary between 1.51 psi and 1.57 psi, which can be a peak-peak variation of 4% about the mean. In other words, the inventive multiple flow grooved nozzles described herein can result in ~7x reduction in flow non-uniformities compared to some conventional 3-slot nozzles.

In some embodiments, the contoured surface of the nozzle has an arcuate shape and may be sectioned or may have a tapered alignment surface to promote even seating. In some embodiments, the inner nozzle has all or many of its "flow-creating" features positioned highly to a tapered seat. In some embodiments, the outer nozzle is highly positioned to inner and fastened to ensure alignment, safe operation at high pressure, seal of gas and conductivity of capacitive circuit. Because slip fits, press fits, and diametrical mating features have inherent variation, in order to ensure consistent performance, tight tolerances must be maintained on double nozzles of this design (tolerances that are difficult to achieve even with high precision CNC lathes).

In some embodiments, an interface surface between the double nozzle and the laser machine head is formed directly on the inner body portion of the double nozzle. In some embodiments, complementary countered surfaces are formed on the machining head and the inner body portion, which can center and align the bore with the longitudinal axis of the head. In some embodiments, the invention features both of these improvements in a "hybrid" design. In such embodiments, the invention can include a tapered seat on the inner nozzle component to functionally align the primary gas flow with the laser beam and head. The nozzle bore and the angled functional datum feature can be machined simultaneously such that they are highly positioned and coaxial. In some embodiments, the double nozzle design is further improved with a tapered or shaped interface between the inner nozzle and the outer nozzle, such that the radial position errors are minimized through hard contact of the tapered or shaped surfaces. This tapered contact method can improve coaxiality at the expense of axial alignment, which can be functionally less sensitive or critical. In some embodiments, the tapered seat on the inner nozzle and the shaped interface between the inner and outer nozzle are separable concepts, which may be used together or separately to achieve the results and benefits described herein.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 2:
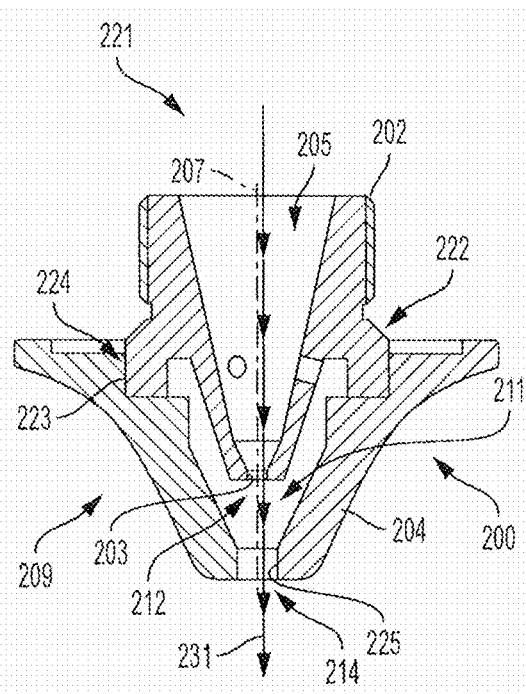
FIG. 2 is a cross-sectional diagram of an improved double nozzle for a laser cutting system, according to an illustrative embodiment of the invention.

FIG. 2 is a cross-sectional diagram of an improved double nozzle 200 for a laser cutting system, according to an illustrative embodiment of the invention. The double nozzle 200 includes an inner body portion 202 having an interior surface 203 defining an inner nozzle bore 205 and an inner nozzle orifice 212. The inner body portion 202 has a first exterior circumferential surface 223 disposed toward a distal end 209 of the inner body portion 202. The inner body portion 202 has a second exterior circumferential surface 222 disposed toward a proximal end 221 of the inner body portion 202. The double nozzle 200 also includes an outer body portion 204 having an interior surface 225 defining an outer nozzle bore 211 and an outer nozzle orifice 214. The second exterior circumferential surface 222 is shaped to mate and align (e.g., directly) with the laser processing head (not shown). The outer body portion 204 is matingly engaged with the first exterior circumferential surface 223 of the inner body portion 202 and is isolated (e.g., substantially) from direct alignment contact with the laser processing head. The inner body portion 202 and the outer body portion 204 are aligned to define a coaxial fluid flow path 231 therethrough.

Figure 1:
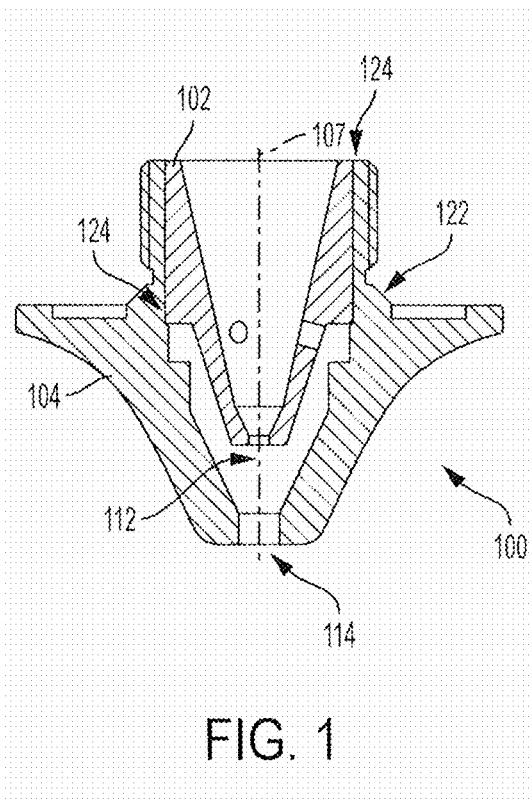
FIG. 1 is a cross-sectional diagram of a prior art double nozzle for a laser cutting system.

Generally, the double nozzle 200 has similar external and internal dimensions to the prior art double nozzle 100 shown and described above in FIG. 1. However, the double nozzle 200 has fewer interface surfaces between the inner nozzle bore 212 of the inner body portion 202 and the longitudinal axis 207 of the laser beam. Specifically, the double nozzle 200 has one interface as a result of forming the second exterior circumferential surface 222 (the nozzle machining head interface surface) directly on the inner body portion 202. Thus, the reduction in interface surfaces can be due to a relocation of the interface 224 between the inner and outer body portions 202, 204, as compared with the interface 124 of the prior art. Such a re-configuration reduces the number of "direct alignment contact" surfaces, e.g., surfaces that control alignment of inner nozzle bore 212 relative to longitudinal axis 207 (even though, in some configurations, some physical contact may be present between the surfaces). In this case, the number of direct alignment contact surfaces is two (i.e., the nozzle machining head interface surface 222 and its complementary surface on the laser head) from the four surfaces shown in the prior art configuration of FIG. 1. Thus, the double nozzle 200 provides a more direct connection between the longitudinal axis 207 and the inner nozzle bore 212, loosens manufacturing requirements on outer body portion 204, and reduces installation complexity and verification procedures. In this configuration, the laser beam and the gas flow can be insulated from direct effects of any assembly errors.

In some embodiments, the inner and outer body portions 202, 204 may be affixed by a variety of methods including friction welding or press fits. In some embodiments, the nozzle machining head interface surface 222 of the double nozzle 200 can include a contoured surface shaped to complement a contoured alignment surface on the laser machining head. Thus, when a technician installs the double nozzle 200 in a laser machining head, the contoured surface of the double nozzle 200 mates with the contoured alignment surface of the laser machining head, facilitating alignment of the double nozzle 200 with the longitudinal axis 207. This alignment occurs because as the double nozzle 200 is installed in the laser machining head, the contoured mating surface contacts the first contoured alignment surface centering the double nozzle 200, thereby causing the longitudinal axis 207 of the double nozzle 200 to align with the torch axis and thus the laser beam. As a result, the double nozzle 200 becomes centered about the laser beam to provide a concentric uniform annular gas flow about the laser beam to facilitate torch operation. This radially-centered double nozzle 200 avoids the field replacement and alignment problems of the prior art, and/or reduces or eliminates the high precision manufacturing requirements of multiple parts.

In some embodiments, the contoured surface is an arcuate section and/or a linear taper. Such an arcuate section can have a fixed radius of curvature or several radii of curvature. Contoured or tapered alignment surfaces can promote even seating and alignment of the double nozzle 200 and the inner nozzle bore 212 relative to the longitudinal axis 207. The angle formed between the taper and the axis of the laser beam can be any value less than 90 degrees, preferably less than about 45 degrees and, more preferably, less than about 20 degrees. Such configurations can help to pair contoured mating surfaces with contoured alignment surfaces to centrally dispose the double nozzle 200 along the longitudinal axis 207.

Figure 3:
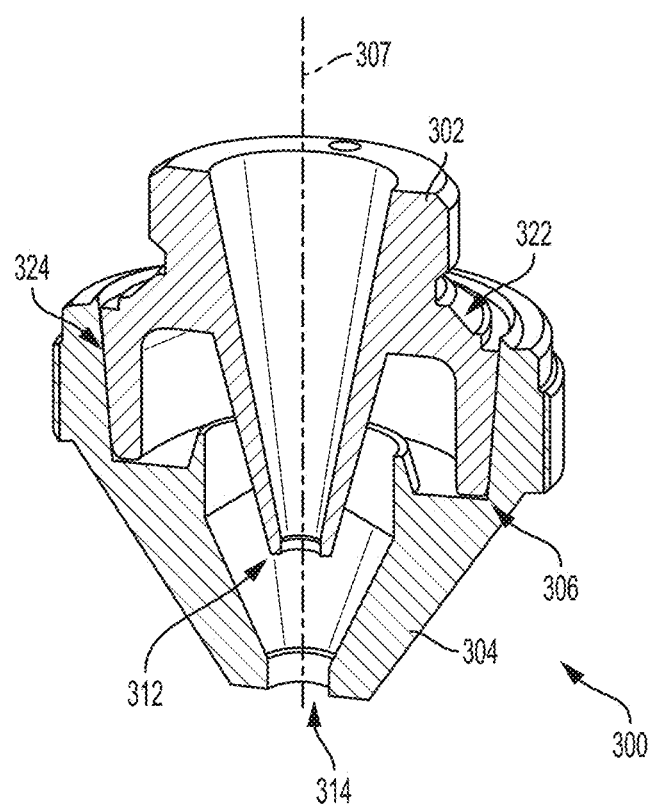
FIG. 3 is a three-dimensional half-sectional view of an improved double nozzle for a laser cutting system, according to an illustrative embodiment of the invention.

FIG. 3 is a three-dimensional half-sectional view of an improved double nozzle 300 for a laser cutting system, according to an illustrative embodiment of the invention. The double nozzle 300 includes an inner body portion 302 having an inner nozzle bore 312 and an outer body portion 304 having an outer nozzle bore 314, both of which are oriented along a longitudinal axis 307 of the laser beam. The double nozzle 300 has a similar configuration to the double nozzle 200 shown and described above in FIG. 2, with several notable differences. For example, in this configuration, the interface 324 between the inner body portion 302 and the outer body portion 304 is tapered in a "conical seating" arrangement with respect to the longitudinal axis 307. As shown, this "conical interference" interface 324 is a "conical interference interface," which can have a linear dimension of about 0.001 to 0.003 inches. In some embodiments, the conical interference interface 324 can be pressed and crimped, e.g., to about 2000 lbF. The inner body portion 302 also includes an exterior surface 322. The exterior surface 322 can include a conical datum feature that is aligned to the through bore. The outer body portion 304 can have an "axial stop" 306. The conical interference interface 324 and/or the axial stop 306 can help align the inner body portion 302 to the outer body portion 304 and the longitudinal axis 307.

Figure 4:
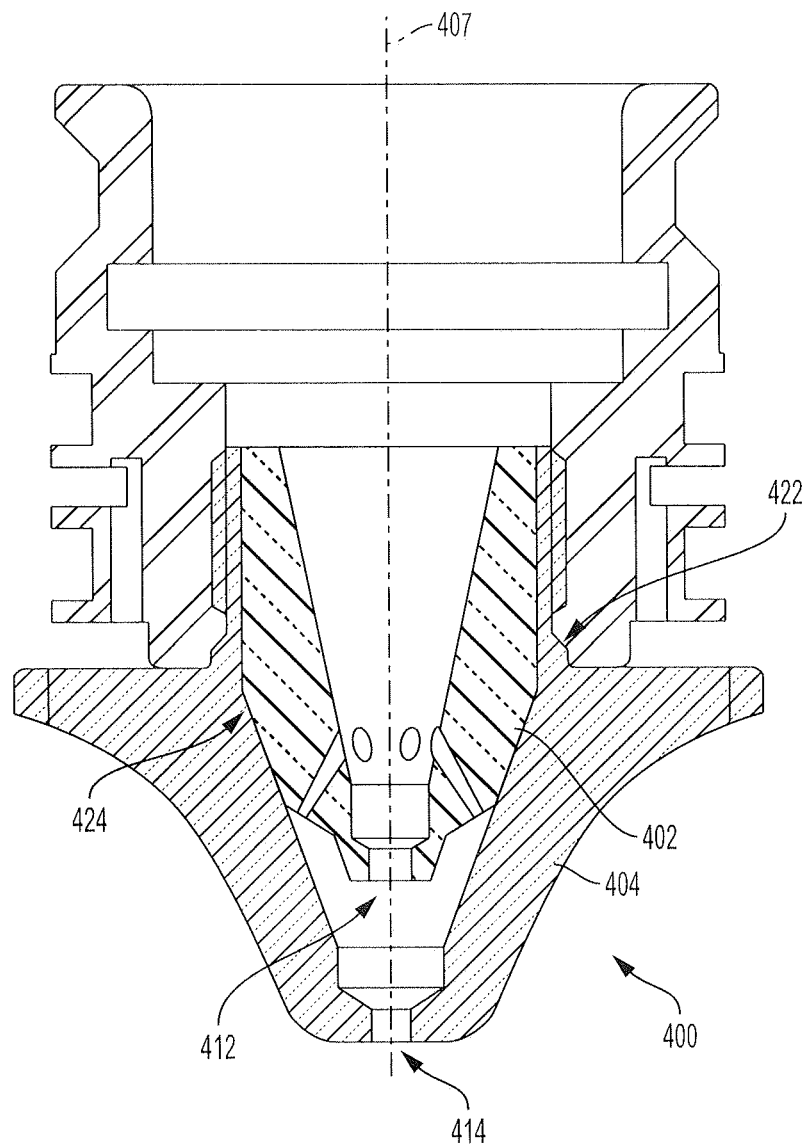
FIG. 4 is a cross-sectional diagram of an improved double nozzle for a laser cutting system in which the inner body portion is conically seated within the outer body portion, according to an illustrative embodiment of the invention.

FIG. 4 is a cross-sectional diagram of another improved double nozzle 400 for a laser cutting system, according to an illustrative embodiment of the invention. The double nozzle 400 includes an inner body portion 402 having an inner nozzle bore 412 and an outer body portion 404 having an outer nozzle bore 414, which are oriented along a longitudinal axis 407 of the laser beam. The double nozzle 400 has a similar configuration to the double nozzle 300 shown and described above in FIG. 3 with respect to the "conical seating" arrangement, although the FIG. 4 configuration does not employ the reduced number of interface surfaces shown in FIG. 2. In the FIG. 4 configuration, the inner body portion 402 is conically seated within the outer body portion 404. The conical seating itself improves alignment of inner nozzle bore 412 and outer nozzle bore 414 with respect to the longitudinal axis 407 (and hence the laser beam), independent of the benefits of the redesign shown in FIG. 2.

Generally, coaxiality of the inner body portion and the outer body portion can be further improved by avoiding slip fits and press fits in favor of a clearance fit, with inner and outer body portions adjusted to a coaxial position via precise tooling and subsequently attached to each other (e.g., via screws, tabs, welds, glue bonds, solder joints or another method that results in the two parts being fixed in a highly positioned coaxial arrangement). In some embodiments, the inner and outer body portions can be made to have a low impedance, high conductivity bond (e.g., to allow for high frequency AC capacitive height sensing signals to pass between the inner body portion and the outer body portion). Such a configuration can be achieved through direct contact of fasteners, conductive elements within expox mix, soft solder, silver braze, or welding (e.g., laser welding, friction welding, or ebeam welding). Alternatively or in conjunction with the screwed and/or tapered surfaces for alignment discussed herein, nozzles can be formed pre-aligned and fixtured, and/or glued or otherwise welded, bonded, fastened and joined for industrial cutting applications and solutions.

Figure 4A:
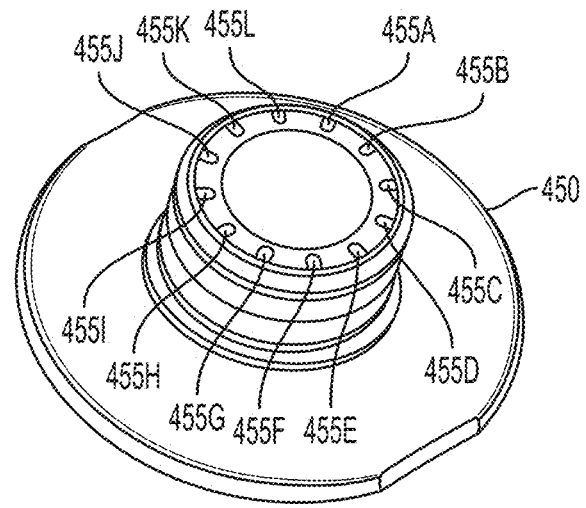
FIGS. 4A-4B show perspective views of double nozzles having more than three slots, according to illustrative embodiments of the invention.
Figure 4B:
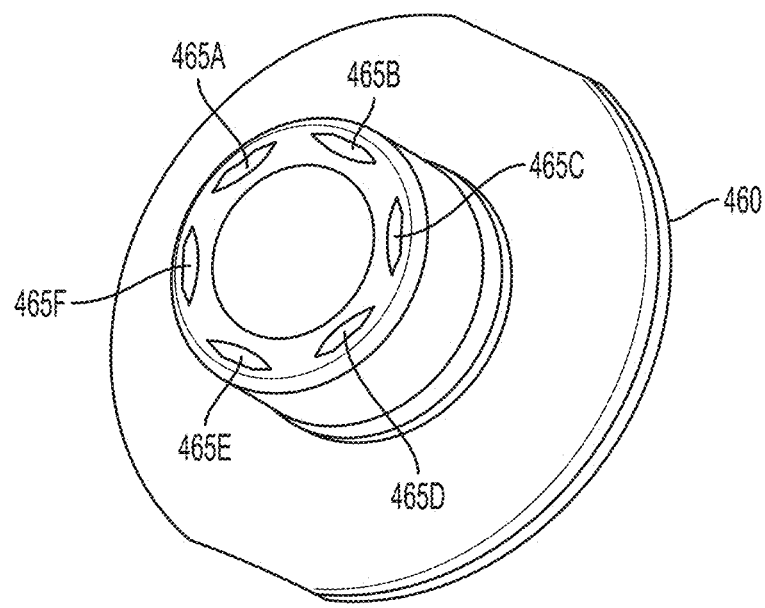

In some embodiments, uniformity of the double nozzle flow is important to the consistency of the cut process. Currently, most double nozzles are characterized by an inner nozzle with a tri-lobe feature and three slots to meter and distribute the flow about the central process gas bore. However, these three slots can create a non-uniform flow within the double nozzle. In contrast, in some embodiments, the invention uses more than three slots. For example, FIG. 4A shows a double nozzle 450 having twelve slots 455A-L, and FIG. 4B shows a double nozzle 460 having six slots 465A-465F. The configurations of the nozzles 450, 460 can enhance the process consistency and cut quality over traditional three-slot or three-bore configurations.

Figure 5:
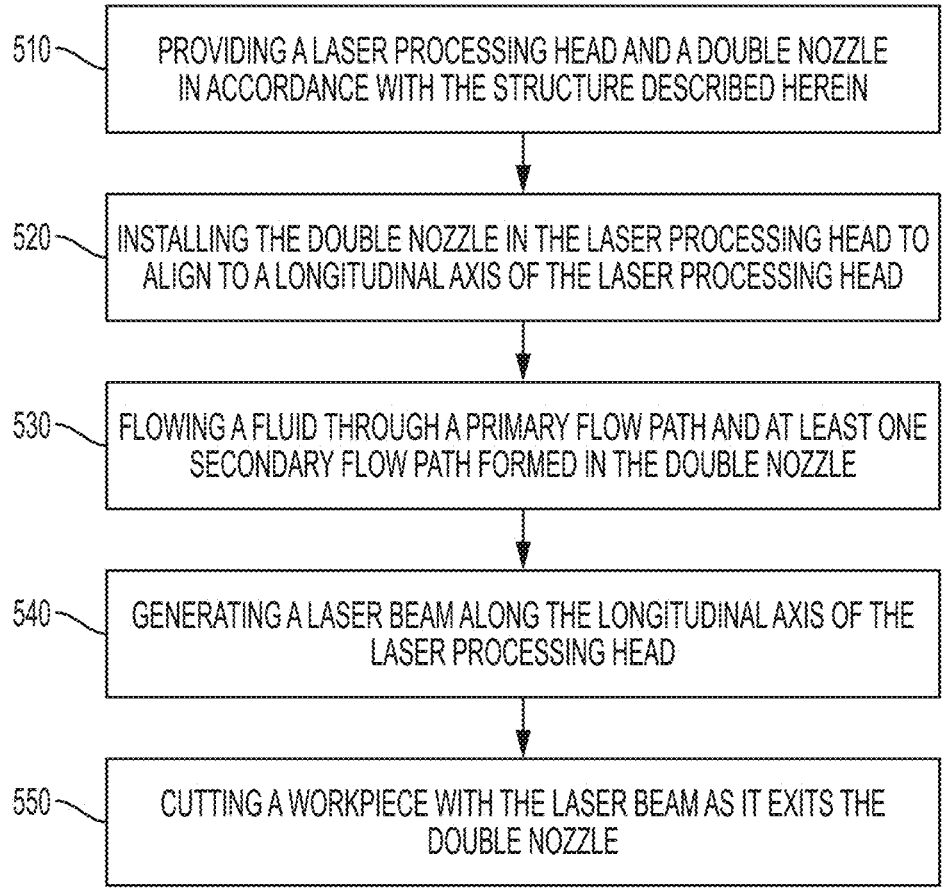
FIG. 5 is a flow diagram of method of cutting a workpiece using a laser cutting system, according to an illustrative embodiment of the invention.

FIG. 5 is a flow diagram 500 of a method of cutting a workpiece using a laser cutting system, according to an illustrative embodiment of the invention. The method 500 includes a step 510 of providing a laser processing head and a double nozzle. The double nozzle has an inner body portion, an outer body portion, and an axial bore. The inner body portion has a first exterior surface shaped to complement a contoured alignment surface on the laser processing head and a second exterior surface shaped to complement an interior circumferential mating surface of the outer body portion. The outer body portion is secured to the inner body portion along the circumferential mating surface and is isolated from direct alignment contact with the laser processing head. The method 500 includes a step 520 of installing the double nozzle in the laser processing head to align to a longitudinal axis of the laser processing head. The method 500 includes a step 530 of flowing a fluid through a primary flow path and at least one secondary flow path formed in the double nozzle. The method 500 includes a step 540 of generating a laser beam along the longitudinal axis of the laser processing head. The method 500 includes a step 550 of cutting a workpiece with the laser beam as it exits the double nozzle.

While the invention has been particularly shown and described with reference to specific preferred embodiments, it should be understood by those skilled in the art that various changes in from and detail may be made therein without departing from the spirit and scope of the invention as defined by the following claims.

What is claimed is:

1. A double nozzle for a laser processing head, the double nozzle comprising:
    an inner body portion configured to assist transport of a first fluid flow from the laser processing head toward an exit orifice of the double nozzle, the inner body portion having an interior surface defining a first bore, a first exterior circumferential surface disposed toward a distal end of the inner body portion, and a second exterior circumferential surface disposed toward a proximal end of the inner body portion, the second exterior circumferential surface shaped to mate and align with the laser processing head; and
    an outer body portion having an interior surface defining a second bore, the outer body portion matingly engaged with the first exterior circumferential surface of the inner body portion and isolated from direct alignment contact with the laser processing head, the second bore configured to assist transport of a second fluid flow that circumferentially surrounds the first fluid flow,
    wherein the inner body portion and the outer body portion are aligned to define a coaxial fluid flow path therethrough.

2. The double nozzle of claim 1 wherein the second exterior circumferential surface is tapered relative to a longitudinal axis of the double nozzle.

3. The double nozzle of claim 2 wherein the tapered surface is at an angle of about 4.5 degrees to about 5.5 degrees with respect to the longitudinal axis.

4. The double nozzle of claim 1 further comprising a set of fluid flow paths formed between the inner body portion and the outer body portion.

5. The double nozzle of claim 4 wherein the set of fluid flow paths is formed at an interface between the first exterior circumferential surface of the inner body portion and the outer body portion.

6. The double nozzle of claim 4 wherein the set of fluid flow paths includes six distinct flow paths.

7. The double nozzle of claim 1 wherein the second exterior circumferential surface includes a conical interference interface with the interior surface of the outer body portion, the conical interface including a spacing of about 0.001 to 0.003 inches between the surfaces.

8. The double nozzle of claim 1 wherein the inner body portion and the outer body portion are crimped using a force of about 2000 lbF.

9. The double nozzle of claim 1 wherein the second bore of the outer body portion includes an axial stop for positioning relative to the inner body portion.

10. The double nozzle of claim 1 wherein the inner body portion has a conical datum feature received by the second bore of the outer body portion.

11. A method of cutting a workpiece using a laser cutting system, the method comprising:
providing a laser processing head and a double nozzle, the double nozzle having an inner body portion, an outer body portion, and an axial bore, the inner body portion configured to assist transport of a first fluid flow from the laser processing head toward an exit orifice of the double nozzle, the inner body portion having a first exterior surface shaped to complement a contoured alignment surface on the laser processing head and a second exterior surface shaped to complement an interior circumferential mating surface of the outer body portion, the outer body portion secured to the inner body portion along the circumferential mating surface and isolated from direct alignment contact with the laser processing head, the outer body portion having an interior surface defining a second bore configured to assist transport of a second fluid flow that circumferentially surrounds the first fluid flow;
installing the double nozzle in the laser processing head to align to a longitudinal axis of the laser processing head;
flowing a fluid through a primary flow path and at least one secondary flow path formed in the double nozzle;
generating a laser beam along the longitudinal axis of the laser processing head; and
cutting a workpiece with the laser beam as it exits the double nozzle.

12. The method of claim 11 wherein the second exterior surface is tapered relative to a longitudinal axis of the double nozzle.

13. The method of claim 12 wherein the taper is at an angle of about 4 to about 5.5 degrees relative to the longitudinal axis.

14. The method of claim 11 wherein the double nozzle further comprises a set of fluid flow paths formed between the inner body portion and the outer body portion.

15. The method of claim 14 wherein the set of fluid flow paths is formed at an interface between the first exterior surface of the inner body portion and the outer body portion.

16. The method of claim 14 wherein the set of fluid flow paths includes six distinct flow paths.

17. The method of claim 11 wherein the second exterior surface is a conical interference interface with the interior surface of the outer body portion, the conical interface including a spacing of about 0.001 to 0.003 inches between the surfaces.

18. The method of claim 11 wherein the inner body portion and the outer body portion are crimped using a force of about 2000 lbF.

19. The method of claim 11 wherein the second bore of the outer body portion includes an axial stop for positioning relative to the inner body portion.

20. The method of claim 11 wherein the inner body portion has a conical datum feature received by the second bore of the outer body portion.

* * * * *